United States Patent Office 2,714,558
Patented Aug. 2, 1955

---

2,714,558

HEAT ABSORBING GLASS

Wilbur F. Brown, Glenn C. Mook, Joseph J. Jarosi, and Curtis W. Davis, Jr., Toledo, Ohio, assignors to Libbey-Owens-Ford Glass Company, Toledo, Ohio, a corporation of Ohio No Drawing. Application June 24, 1952,
Serial No. 295,356

3 Claims. (Cl. 106—54)

The present invention relates generally to transparent, heat absorbing glasses, and particularly to a new, low expansion, soda-lime-silica, heat absorbing glass.

Most commercial heat absorbing glasses depend upon the presence of iron oxide, preferably in the form of ferrous oxide, for bringing about the absorption of heat; and, generally speaking, there are two main types of heat absorbing glasses, namely, borosilicate heat absorbing glasses and soda-lime-silica heat absorbing glasses.

The former are made from special batches containing silica and boric oxide as essential ingredients, while the latter are usually made up of more or less conventional plate or window glass batches to which iron oxide has been added. The advantages of the borosilicate heat absorbing glasses are their excellent low expansion characteristics, while soda-lime-silica heat absorbing glasses have the advantage of being relatively simple to make, low in cost, and readily workable.

Now it is an aim of this invention to provide a new transparent heat absorbing glass which is a relatively low expansion, soda-lime-silica glass, and which combines a maximum of the advantages of both of the heretofore known general types of heat absorbing glasses with a minimum of the disadvantages.

Another object is the provision of a soda-lime-silica heat absorbing glass which has a relatively high resistance to fracture as a result of thermal shock.

Another object is to provide a heat absorbing glass of the soda-lime-silica type in which a somewhat reduced absorption of radiant energy is accompanied by a considerably lessened coefficient of expansion and increased thermal shock resistance.

Still another object is the provision of a transparent heat absorbing glass of the above character which is a pale bluish-green in color and exhibits good glare-reducing properties.

Further objects and advantages will become apparent during the course of the following description of the new glass and of the manner of producing it.

Thus, in producing the special heat absorbing glass in accordance with this invention I employ a batch containing the following ingredients, or equivalent sources of glass making materials, in approximately the proportions shown:

| | Pounds |
|---|---|
| Sand | 1000 |
| Limestone | 311 |
| Soda ash | 127 |
| Salt cake | 70 |
| Feldspar | 26 |
| Salt | 20 |
| Borax | 316 |
| Ground coal | 8.5 |
| Rouge | 5.2 | to produce a glass having substantially the following average analysis:

| | Per cent |
|---|---|
| $SiO_2$ | 69.1+ |
| $Fe_2O_3$ | .375 |
| $Al_2O_3$ | .4 |
| $TiO_2$ | .02 |
| $CaO$ | 11.5 |
| $MgO$ | .1 |
| $Na_2O$ | 10.4 |
| $K_2O$ | .1 |
| $B_2O_3$ | 7.8 |
| $Cl_2$ | .2 |
| $O_2 \circeq Cl_2$ less than | .05 |

This glass will have a molecular ratio of boric oxide to soda, lime and silica that is approximately

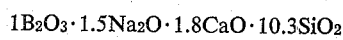
$1B_2O_3 \cdot 1.5Na_2O \cdot 1.8CaO \cdot 10.3SiO_2$

The amount of borax given in the batch set forth above (316 pounds) is based on the use of $Na_2B_4O_7 \cdot 10H_2O$. Where $Na_2B_4O_7 \cdot 5H_2O$ is employed, approximately 243 pounds of the borax in the same batch will give similar results.

A glass produced as above will have a coefficient of linear expansion of approximately .0000076 to .0000078 per degrees centigrade; and in thicknesses of one quarter inch it will have approximately the following transmission factors:

| | Per cent |
|---|---|
| Illuminant C (daylight) transmittance | 76.5 to 79 |
| Total radiation (sun) transmittance | 42 to 50 |

In addition, it will melt much more readily, be easier and cheaper to make and be more adaptable to working and processing than borosilicate heat absorbing glass, while, at the same time, having a considerably lower coefficient of expansion and greater resistance to thermal shock than known soda-lime-silica heat absorbing glass.

The particular range of coefficient of expansion as set forth above is of considerable importance, because we have discovered that a glass of this character having a coefficient of expansion that is materially below this range will be of a quality that falls below the requirements for commercially saleable sheet and plate glass.

It is to be understood that the form of the invention herewith shown and described is to be taken as a preferred embodiment of the same, but that other equivalent embodiments may be resorted to without departing from the spirit of the invention or the scope of the subjoined claims.

We claim:

1. A low expansion soda-lime-silica heat absorbing glass produced from a batch comprising substantially the following ingredients in approximately the proportions shown:

| | Pounds |
|---|---|
| Sand | 1000 |
| Limestone | 311 |
| Soda ash | 127 |
| Salt cake | 70 |
| Feldspar | 26 |
| Salt | 20 |
| Borax | 316 |
| Ground coal | 8.5 |
| Rouge | 5.2 | and having a daylight transmittance of 76.5 to 79% and a total sun radiation transmittance of 42 to 50%.

2. A relatively low expansion high heat absorbing soda-lime-silica glass having substantially the following calculated composition:

| | Per cent |
|---|---|
| $SiO_2$ | 69.1+ |
| $Fe_2O_3$ | .375 |

|  | Per cent |
|---|---|
| $Al_2O_3$ | .4 |
| $TiO_2$ | .02 |
| CaO | 11.5 |
| MgO | .1 |
| $Na_2O$ | 10.4 |
| $K_2O$ | .1 |
| $B_2O_3$ | 7.8 |
| $Cl_2$ | .2 |
| $O_2 = Cl_2$ less than | .05 | and a daylight transmittance between 76.5 and 79 per cent with a total sun radiation transmittance between 42 and 50 per cent.

3. A relatively low expansion flat glass made from a soda-lime-silica batch including boric oxide and iron oxide and in which the molecular ratio of boric oxide to soda, lime and silica is approximately $$1B_2O_3 \cdot 1.5Na_2O \cdot 1.8CaO \cdot 10.3SiO_2$$

said glass having in thicknesses of approximately ¼ inch a daylight transmittance of approximately 76.5 to 79%, a total sun radiation transmittance of approximately 42 to 50%, and a coefficient of linear expansion from approximately .0000076 to .0000078 per degree centigrade.

References Cited in the file of this patent

UNITED STATES PATENTS 2,397,195   Mook et al. _____ Mar. 26, 1946